United States Patent [19]
Nouchi et al.

[11] Patent Number: 5,453,893
[45] Date of Patent: Sep. 26, 1995

[54] HEAD CLEANING DEVICE

[75] Inventors: Norimoto Nouchi, Katano; Masaya Sakaguchi, Neyagawa; Hiroshi Yoda, Hirakata; Yoshiaki Mizoh, Neyagawa, all of Japan

[73] Assignee: Matsushita Electric Industrial Co., Ltd., Osaka, Japan

[21] Appl. No.: 76,571

[22] Filed: Jun. 14, 1993

[30] Foreign Application Priority Data

Jun. 15, 1992 [JP] Japan .................................. 4-154645
Dec. 22, 1992 [JP] Japan .................................. 4-341915

[51] Int. Cl.$^6$ ...................................................... G11B 5/41
[52] U.S. Cl. ...................................................... 360/128
[58] Field of Search ................................. 360/128, 69, 75

[56] References Cited

U.S. PATENT DOCUMENTS

| 4,462,056 | 7/1984 | Kara .......................................... 360/128 |
| 5,012,376 | 4/1991 | Joannou et al. ........................ 360/128 |
| 5,193,033 | 3/1993 | Shimoi et al. ........................... 360/128 |

FOREIGN PATENT DOCUMENTS 4-205809  7/1992  Japan .................................. 360/128

OTHER PUBLICATIONS

Bruce et al, "Liquid . . . Tape", IBM Tech Disc Bull, vol. 23, No. 11, Apr. 1981, p. 5155.

*Primary Examiner*—Robert S. Tupper
*Attorney, Agent, or Firm*—Ratner & Prestia

[57] ABSTRACT

A head cleaning device for use in a magnetic recording and reproducing apparatus comprises a cleaning roller in which a lubricant with an excellent lubricating action under low humidity conditions impregnates the soft material. This lubricant compensates for the drop in the natural lubricating action resulting from a moisture deficiency, and therefore prevents the production of seized deposits. Furthermore, the head cleaning device comprises a first cleaning portion impregnated with polymer resin and abrasive particles, and a second cleaning portion comprising only a soft material, the second cleaning portion can remove by wiping any abrasive particles or deposits left on the magnetic head surface immediately after the abrasive cleaning action of the first cleaning member.

6 Claims, 6 Drawing Sheets

HEAD CLEANING DEVICE

BACKGROUND OF THE INVENTION

1. Field of the Invention

The present invention relates to a head cleaning device for cleaning a magnetic head for use in a magnetic recording and reproducing apparatus and, more particularly, to a head cleaning device for removing deposits adhering to such magnetic head therefrom.

2. Description of the Prior Art

Reproducing with high reliability the signal recorded to magnetic tape is an essential requirement for any magnetic recording and reproducing apparatus. After extended operation, however, magnetic particles, binder, resin, and other constituents of the magnetic tape separate from the tape and adhere to the head surface in contact with the magnetic tape. This results in a variety of problems relating to the electromagnetic conversion characteristics of the magnetic head, particularly reduced output, clogging, and signal dropout.

Various methods of removing these deposits from the sliding contact surface of the magnetic head have been proposed in, for example, U.S. Pat. No. 4,462,056 which was issued to Kara Jul. 24, 1984 and U.S. Pat. No. 5,012,376 which was issued to Joannou et al. These methods make it possible to remove deposits with a relatively weak force acting on the magnetic head surface. Under low humidity conditions, however, seized deposits with a bonding strength greater than the relatively weak force applied by the above methods are also formed from the magnetic tape onto the sliding surface of the magnetic head, resulting in the occurrence of so-called brown strain on the magnetic head surface. As a result, the operating range of these methods is limited.

The brown stain cited in this invention is described briefly below. Moisture in the air is absorbed by the surfaces of the various components associated with the relative movement of the magnetic tape to the magnetic head, which rotates at high speed, and contributes to the smooth movement of the tape relative to the magnetic head by acting as a lubricating film. In low humidity conditions, however, the contribution of ambient moisture to this smooth movement is reduced, increasing the coefficient of friction between the tape and head, and increasing the degree of direct contact between the tape and head.

Particulate separating from the magnetic layer of the tape then triggers the production of seized deposits with a high adhesive strength on the sliding surface of the magnetic head. These seized deposits cannot be removed by a simple solvent and wiping action, and therefore gradually accumulate, creating a spacing loss between the magnetic head and magnetic tape that results in reduced output characteristics.

SUMMARY OF THE INVENTION

The object of the present invention is therefore to provide a head cleaning device which solves these problems.

The present invention has been developed with a view to substantially solving the above described disadvantages and has for its essential object to provide an improved head cleaning device.

In order to achieve the aforementioned objective, a head cleaning device used for cleaning the circumference surface of a magnetic head of a magnetic recording and reproducing apparatus to prevent and remove brown stain formed thereon, said device comprises cleaning roller means having of a soft material; and support means for rotatably supporting said cleaning roller means along an axis thereof and pressing said cleaning roller means with a predetermined rotational resistance against the circumference surface of said magnetic head such that the circumference surface of said cleaning roller cleans the circumference surface of said magnetic head while said cleaning roller means is rotated by said magnetic head in rotation.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

First Embodiment

Figure 1A:
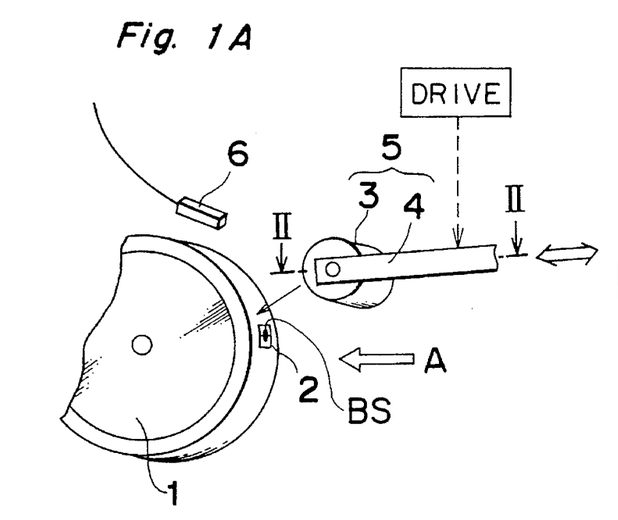
FIG. 1A is a schematic perspective view showing a head cleaning device according to a first embodiment of the present invention.

Referring to FIG. 1A, a head cleaning device according to a first embodiment of the present invention used for magnetic recording and reproducing apparatus (not shown) is shown. The head cleaning device is provided beside a magnetic head 2 incorporated in a circumference surface of a rotating head cylinder 1. The head cleaning device includes a cleaning unit 5 comprising a cleaning roller 3 and a roller support member 4. The roller support member 4 rotatably holds the cleaning roller 3 and can moves in the direction indicated by an arrow A. The cleaning roller 3 is pressed against the circumference surface of the head cylinder 1 to remove brown stains BS (seized deposit to)

formed on the magnet head surface 2.

Figure 1B:
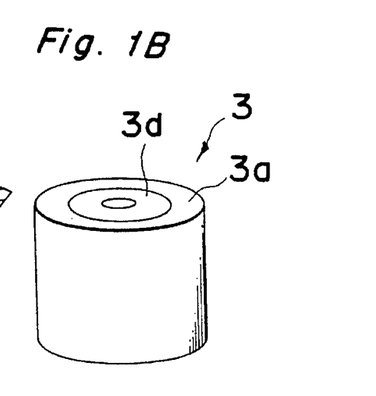
FIG. 1B is an enlarged perspective view showing the cleaning roller the head cleaning device shown in FIG. 1A.

Referring to FIG. 1B, an enlarged perspective view of an example of the cleaning roller 3 is shown. The cleaning roller 3 comprises a cylindrical cleaning member 3a and a holder member 3d provided inside the cleaning member 3a. The constitutions of cleaning member 3a is described later with reference to FIGS. 3A, 3B, 3C, and 3B.

Figure 2:
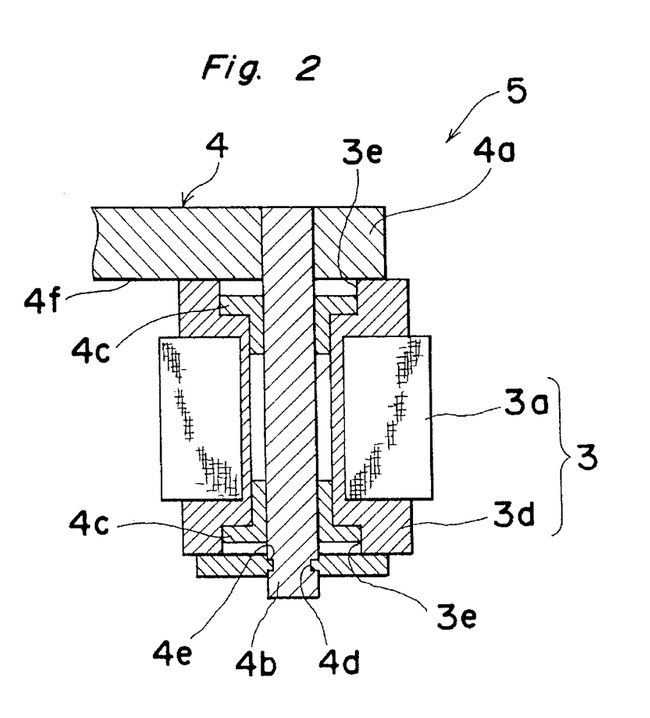
FIG. 2 is a cross-sectional view taken along a line II—II shown in FIG. 1A, FIGS. 3A, 3B, 3C, and 3D are graphs schematically showing various constitutions of the material used for the cleaning roller according to the present invention.
Figure 6:
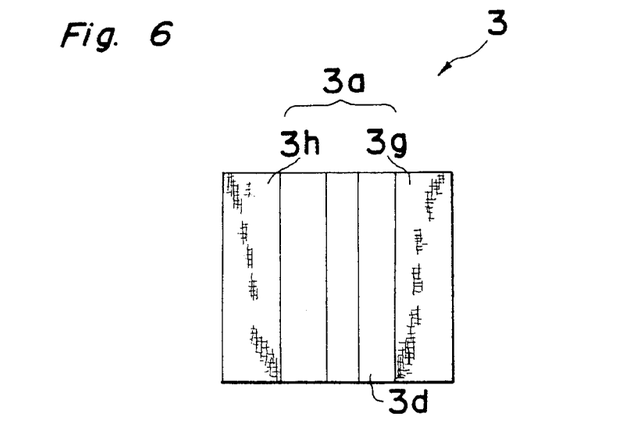
FIG. 6 is a cross-sectional view taken along a line VI—VI shown in FIG. 5.

Referring to FIG. 2, a cross-sectional view of the cleaning unit 5 is shown. The roller support member 4 includes an elongated support arm 4a, a shaft 4b provided vertically from an inside surface 4f of the support arm 4a. The shaft 4b is provided with a notched portion 4d formed on its circumference surface at the position away from the support arm 4a. The cylindrical cleaning member 3a is embedded in the holder member 3d, as shown in FIG. 2, and is firmly secured therein. It is needless to say that the cleaning and holder members 3a and 3b can be formed in any other suitable configuration, for example, of two concentric tubes which is shown in FIG. 6. At both opposite ends of the holder member 3d, formed are openings 3e which are mutually connected by a tubular hole extending in alignment with the axis of the holder member. The tubular hole has a diameter smaller than that of the openings 3e but larger than that of the shaft 4b.

The holder member 3d is applied with a mini bearing 4c fitted in each of the openings 3e and is set to the support arm 4a such that the shaft 4b inserts the tubular hole as the notched portion 4d thereof extrudes from the holder member 3d. A stop pin 4e is engaged to the notch portion 4d so as to press and secure the cleaning roller 3 to the support arm 4a. Since the end surface of the holder member 3d is kept in press contact with the inside surface 4f of the support arm 4a by the stop pin 4e, a frictional force is available therebetween. This frictional force will act as a resistant force when the cleaning roller 3 rotates along the shaft.

Referring to FIGS. 3A, 3B, 3C, and 3D, schematic enlarged view showing constitutions of the material used for cleaning member 3a for various application are shown.

Figure 3A:
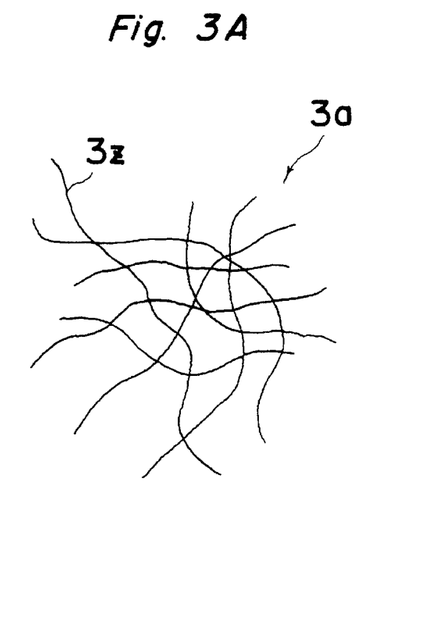

As shown in FIG. 3A, the cleaning member 3a is substantially comprised of a soft material such as felt fibers 3z.

Figure 3B:
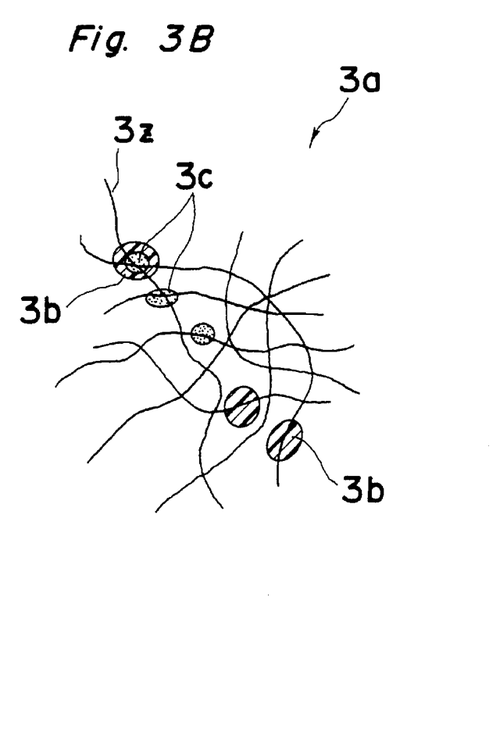

In FIG. 3B, the cleaning member 3a used for removing the seized deposits (brown stain) from the head surface 2 is shown. The soft material 3a is impregnated with polymer resin 3b and abrasive particles 3c such that the abrasive particles 3c are held by the polymer resin 3b to the felt fibers 3z. Thus held abrasive particles 3c can grind off the brown stain formed on the head surface 2 by rubbing the head surface with the cleaning member 3a.

Figure 3C:
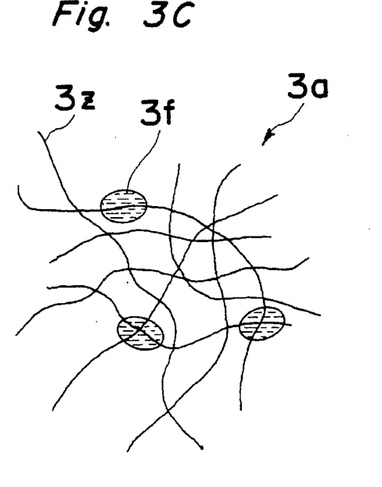

In FIG. 3C, the cleaning member 3a used for preventing the formation of brown stain on the head surface 2 is shown. The soft material 3a is impregnated with a lubricant 3f having an excellent lubricating action under low humidity conditions. Examples of such lubricants 3f include fatty acids, fatty acid esters, perfluoro carbonic acid, and perfluoro polyether. To stably complement the lubricating action over long-term contact during magnetic tape to magnetic head travel, the lubricant 3f is preferably in a liquid state under the normal operating temperature for magnetic tape travel, i.e., is in a liquid state at temperatures less than 40° C.

Figure 3D:
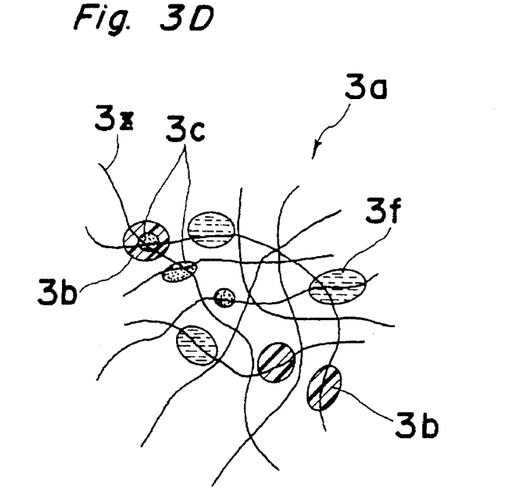

In FIG. 3D, the cleaning member 3a also used for removing the seized deposits from the head surface 2 is shown. In this application, the cleaning member 3a has a constitution combined by those shown in FIGS. 3B and 3C. The soft material 3a is impregnated with polymer resin 3b, abrasive particles 3c, and lubricant 3f. The lubricating action of the buluricant 3f reduces the coefficient between the abrasive particles 8c and the magnetic head surface 2 and enable to grind off the brown stain in a milder manner when compared with the cleaning member 3a of FIG. 3B.

In operation, the cleaning unit 5 moves in the arrow direction A to press the cleaning roller 3 having the above constitutions against the circumference surface of the head cylinder 1 in rotation. By the circumference surface of the head cylinder 1, the cleaning roller 3 is driven to rotate along the shaft 4b. However, the friction between the support arm 4a and the holder member 3d acts as the resistant force against the rotation of cleaning roller, as described above. This resistance force enables the cleaning roller 3 to rub the cylinder surface 1 with a suitable force for cleaning the head 2.

Second Embodiment

Figure 4:
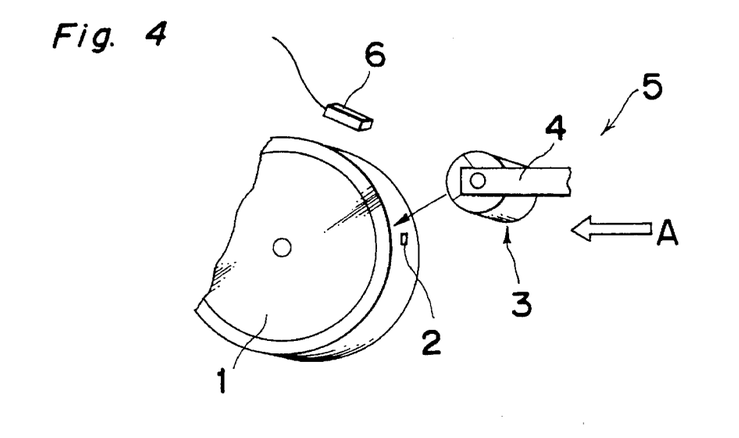
FIG. 4 is a schematic perspective view showing a head cleaning device according to a second embodiment of the present invention.
Figure 5:
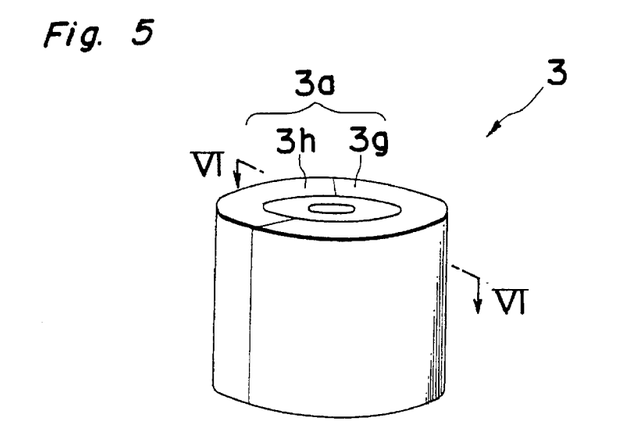
FIG. 5 is an enlarged perspective view showing the cleaning roller of the head cleaning device shown in FIG. 4.

Referring to FIGS. 4, 5, and 6, a head cleaning device according to a second embodiment of the present invention is shown. In this embodiment, head cleaning device has a construction similar to that of the first embodiment, but the cleaning roller 3 has a cleaning member 3a comprised of first and second cleaning portions 3g and 3f. The first cleaning portion 3g is made by soft material impregnated with the abrasive particles 3c and polymer resin 3b, as described above with reference to FIG. 3B, and is used to remove the brown stain BS from the head surface 2. The second cleaning portion is made my the soft material with no impregnation, as described above with reference to FIG. 3A, and is used for wiping off residual deposits and abrasive particles 3c which may dropped from the first cleaning portion 3g.

As best shown in FIG. 5, the first and second cleaning portions 3g and 3h are sharing the single cleaning member 3a by dividing the cleaning member 3a in two portions extending in the axial direction thereof. The cleaning member 3a is divided into first and second cleaning portions 3f and 3g FIG. 5. Although it is shown that the first cleaning portion 3g occupies larger portion than the second cleaning portion 3f in FIG. 5, it is possible to divide first and second portion at an optional ratio according to the application purpose.

In FIG. 6, the right half area of the cleaning member 3a shows the first cleaning portion 3g the constitution, and the left half shows the second portion 3h having the constitution shown in FIG. 3A.

In this embodiment, since the two portions 3g and 3h having different cleaning functions are formed in a single unit of the cleaning roller 3, selecting the ratio of the two portions can control the operation ratio of brown stain removing and wiping off to obtain optimum cleaning result.

Third Embodiment

Figure 7:
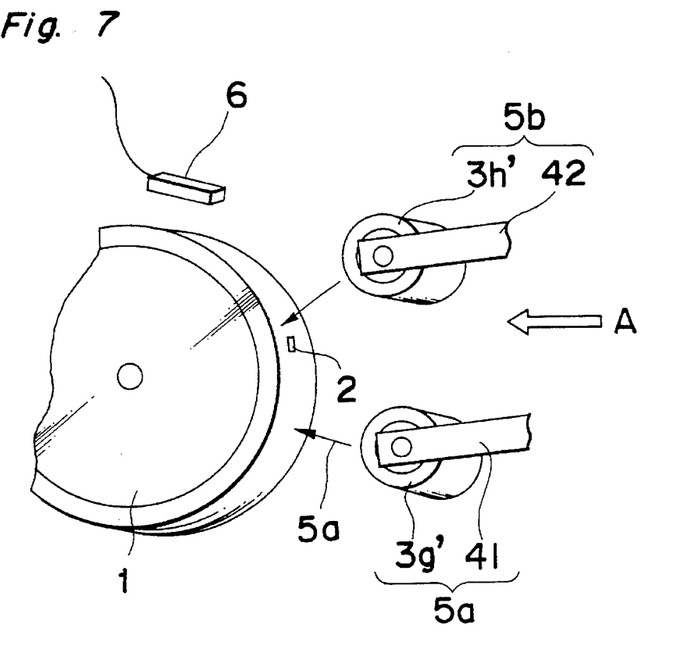
FIG. 7 is a schematic perspective view showing a head cleaning device according to a third embodiment of the present invention.
Figure 8:
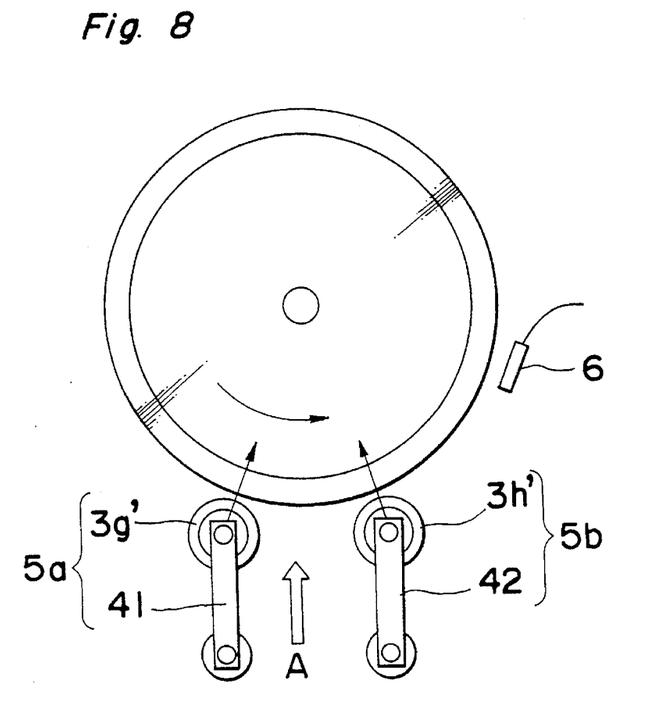
FIG. 8 is a schematic perspective view showing a head cleaning device according to a fourth embodiment of the present invention.

Referring to FIGS. 7 and 8, a head cleaning device according to a third embodiment of the present invention is shown. In this embodiment, the head cleaning device comprises first and second cleaning units 5a and 5b provided separately. The first cleaning unit 5a includes a first cleaning roller 3g' comprised of the same material as the first cleaning portion 3g which is used for removing the brown stain according to the second embodiment. The second cleaning unit 5b includes a second cleaning roller 3h' comprised of the same material as the second cleaning portion 3h which is used for wiping off the residual deposits and abrasive according to the second embodiment. The cleaning rollers 3g' and 3h' are also supported by first and second support members 41 and 42.

Since the first and second cleaning units 5a and 5b can move independently from the other, it is possible to apply the units 5a and 5b to the head cleaning operation at a desirable ratio of operation, resulting in the optimum cleaning effect.

Fourth Embodiment

Figure 9:
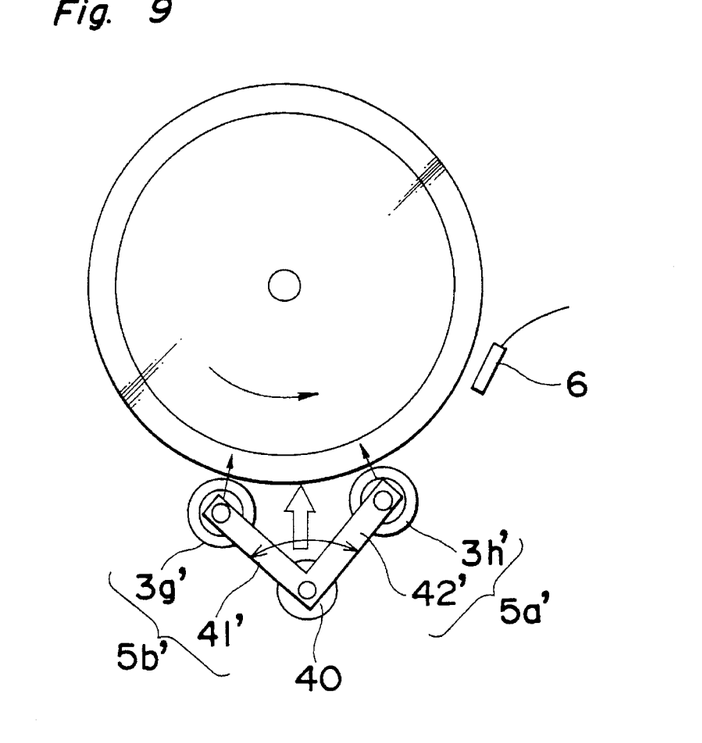
FIG. 9 is a schematic perspective view showing a head cleaning device according to a fifth embodiment of the present invention.

Referring to FIG. 9, a head cleaning device according to a forth embodiment of the present invention is shown. In this embodiment, the head cleaning device comprises first and second cleaning units 5a' and 5b' which have constructions similar to those of the third embodiment, but first and second support members 41' and 42' are integrally combined at the distal ends thereof from the cleaning rollers 3g' and 3h' generally in a V-shaped configuration. The combined cleaning units 5a' and 5b' are rotatably supported by a roller support member 20 at the apex portion of cleaning units 5a' and 5b'. By only this support member 40, the combined cleaning units 5a' and 5b' are moved in the arrow direction A, resulting in that the space required for these mechanism can be reduced and the recording and reproducing apparatus can be made compact. Furthermore, even if both rollers 3g' and 3h' fails to contact to the cylinder surface 1 evenly at the start of the cleaning, the combined cleaning units can swing with respect to the support 40 and are automatically repositioned to contact to the cylinder surface evenly.

In each of the above embodiments, a humidity sensor 6 is provided for detecting the humidity around the cylinder 1 and produce a humidity signal Sh indicative of the detected humidity. This humidity sensor 6 is utilized such that the head cleaning device according to the present invention will start cleaning operation when the detected humidity is below a predetermined value, for example 40%, to prevent or remove the brown stains forming on the magnetic head 2, as described bellow.

Figure 11:
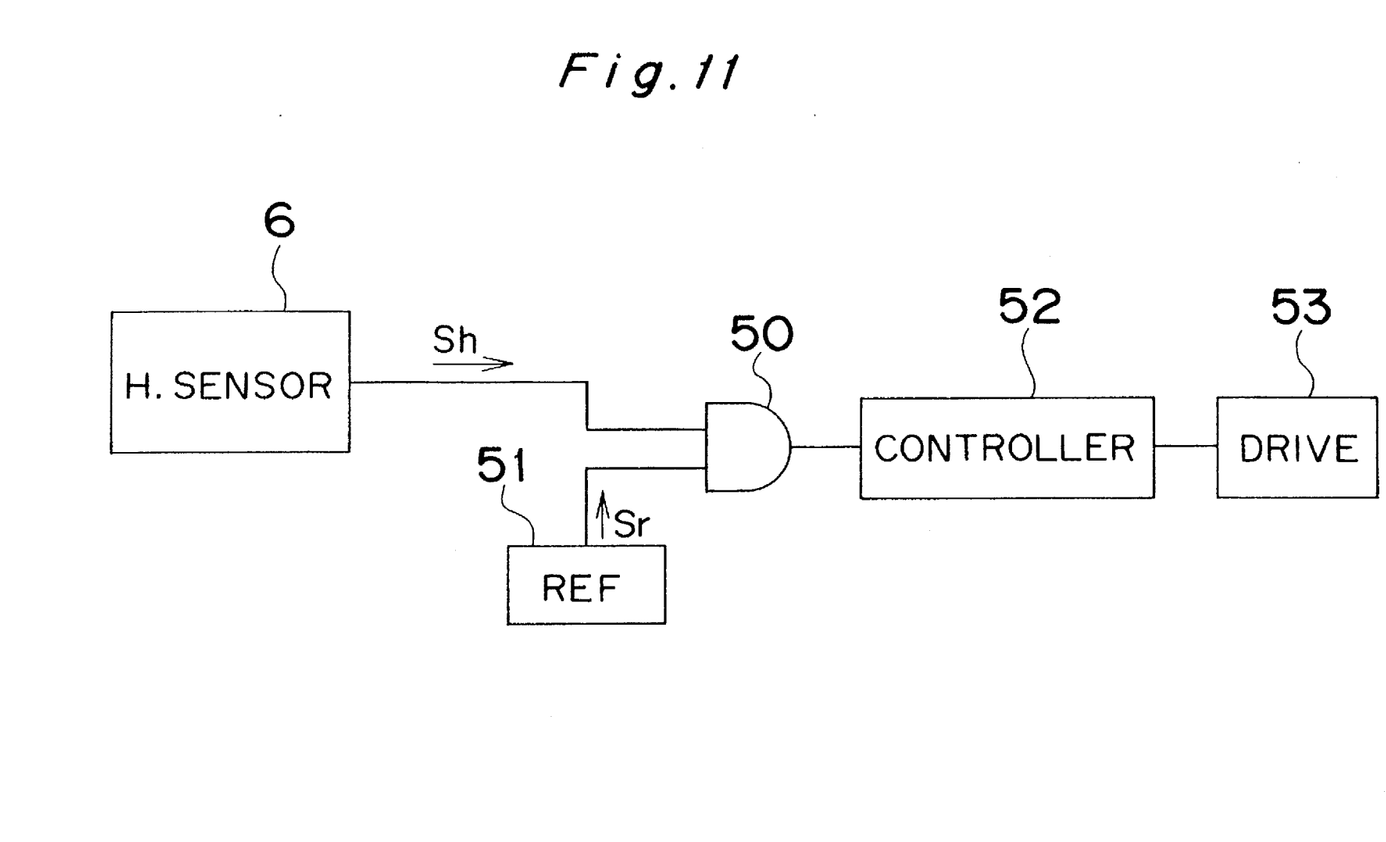
FIG. 11 is a block diagram showing the head cleaning device according to the present invention.

Referring to FIG. 11, a block diagram of the head cleaning device according to the present invention is shown. The head cleaning device includes a comparator 50 for comparing the humidity signal Sh with the reference humidity Sr. A driver 53 is provided for driving the cleaning unit 5. A controller 52 is provided for controlling the driver 53 based on the output form the comparator such that the cleaning unit 5 moves toward the magnetic head surface 2 for cleaning thereof when the detected humidity (Sh) is less than the reference humidity (40%).

It is also possible that the operation of this abrasive action cleaner is started when a deterioration in performance associated with the change in electromagnetic conversion characteristics caused by deposits seizing on the magnetic head surface is detected.

It is to be noted that for first and second cleaning units 5a and 5b to perform the desired operation, the surface of the cleaning rollers 3 must be kept clean. Therefore, to avoid having the same part of each cleaning member always sliding against the magnetic head, a mechanism for moving the cleaning member axially to the cylinder can be provided. One example of such mechanism is proposed by the above described U.S. Pat. No. 5,012,376. Furthermore, it will be obvious to those skilled in the art that such a mechanism is necessary to continuously achieve the substance of the invention.

Figure 10:
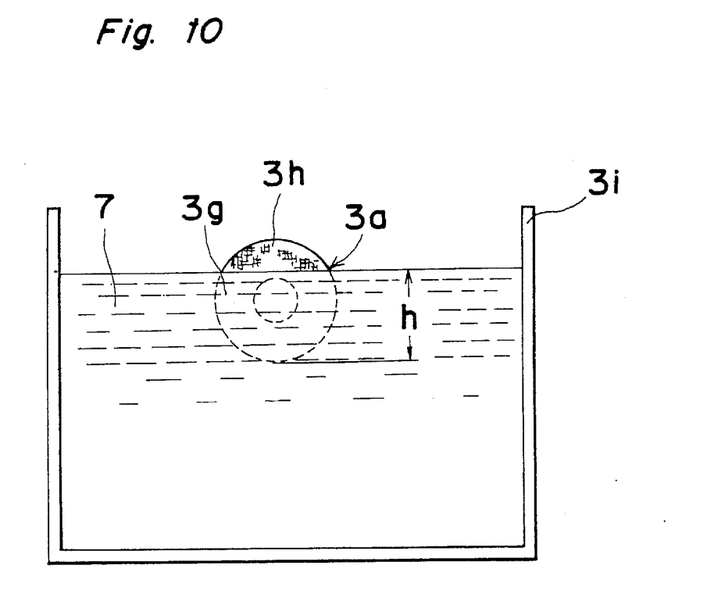
FIG. 10 is a graph in assistance of explaining the method for impregnating the cleaning agents in the cleaning roller according to the prevent invention.

Referring to FIG. 10, a method to have the soft material 3a of the cleaning roller 3 impregnated with cleaning agents such as polymer resins 3b, abrasive particles 3c, or lubricants 3f is shown. A cylindrically shaped soft material 3a is immersed for a specified period of time in a solution 7 of polymer resin, abrasive particles, and solvent; hardener, antistatic agent, and dispersing agent may be also used in the solution 7 as required. When the soft material 3a comprises first and second cleaning portions, 3g and 3h for example, that part of the soft material 3a immersed in the solution 7 pooled in a container 3i becomes the first cleaning portion 3g, and the unimmersed part becomes the second cleaning portion 3h. To form the first cleaning portion 3g, the soft material 3a of diameter D is immersed to a predetermined immersion depth h; it will be obvious that the depth h is smaller than the diameter D. This immersion depth h is the variable determining the abrasive effect of the first cleaning member, and is also related to the specifications of the magnetic recording and reproducing apparatus in which the cleaner is provided.

The solution 7 is prepared in a mixer to assure sufficient mixing and dispersion. Any of many different mixers may be used, including ball mills, sand mills, dissolvers, attriter, high speed mixers, kneaders, Henschel mills, and planetarium mixers.

The polymer resin may be fibrous resins such as nitrocellulose or cellulose acetobutyrate, polyvinyl chlorideacetate copolymer, polyvinylidene chloride, polyurethane, polyamide, urea resin, epoxy resin, polyester resin, fluororesin, acrylonitrile, phenol resin, or a combination of two or more of these or their derivatives considering the dispersion characteristics of the resin.

Possible hardeners include monomeric isocyanate, polyamine, and polyamide.

Possible solvents include methyl ethyl ketone, methyl isobutyl ketone, toluene, cyclohexanone, ethyl acetate, THF (Tetrahydrofuran), DMF(N,N-Dimethylformamide), and isopropyl alcohol.

Antistatic agents include carbon black and graphite powder.

Dispersing agents, including higher fatty acid, higher fatty acid metal salts, higher fatty amide, higher alcohol, phosphoric ester, glycerine, silane coupling agents, and titanium coupling agents, may be added as required.

Preferable soft materials include felt, sponge, nonwoven fabric, deerskin, and wool. It is further preferable for the softness of the material to be retained after impregnation with the polymer resin and abrasive particles by immersion in the above solution. The preferable shape is a cylindrical shape to assure long-term uniform contact with the magnetic head.

Artificial felt materials include polyethylene terephthalate, polyesters such as polyethylene, naphthol, polyethylene, polypropylene and other polyolefins, cellulose acetate, cellulose diacetate, cellulose acetate butyrate, cellulose acetate propylate, and other cellulose derivatives, polyvinyl chloride, polyvinylidene chloride, and other vinyl resin polycarbonates, polyimide, polyether imide, polyamide imide, and other plastics.

Nonwoven fabric materials include polyester, nylon, crimped nylon, acrylic, vinylon, rayon, and cotton.

Abrasive particle materials include a alumina ($Al_2O_3$), titanium oxide ($TiO_2$), iron oxide ($Fe_2O_3$), chromium oxide ($Cr_2O_3$), silicon carbide (SiC), and silicon oxide ($SiO_2$).

It is also possible to separately prepare the first and second cleaning members, and then glue them together using an adhesive. This method is also well within the scope of the present invention.

When the soft material 3a itself is formed of glued resins, immersion of the soft material 3a in a solution 7 containing organic solvent may dissolve the resin and reduce the characteristic softness of a soft material. When using such a soft material 3a, it is therefore necessary to adjust the type and quantities of materials used in the polymer resin 3b and the solvent(s) in the solution 7. Note that if water is used as the solvent, this problem will not occur.

It is to be noted that the head cleaning roller 3 is comprised to sustain the performance of a soft material even after impregnation with the abrasive particles 3c, but because the head cleaner 3 contacts the head cylinder 1 on which the magnetic head is mounted in addition to contacting the magnetic head, there are also irregular cases wherein the head cleaner 3 may impart mechanical damage to the head cylinder 1 surface. To prevent this, a hard thin film such as SiC, $Al_2O_3$, BN, Ti-N, Cr-N, or DLC (diamond carbon) may be formed on the cylinder surface.

The head cleaning devices according to the present invention having cleaning roller 3 prepared under the various conditions are experimented, thorough which the following results are observed.

First experiment

The head cleaning device according to the first embodiment is used in this experiment. A cleaning roller 3 comprised of polyester felt 3a measuring 10 mm outside diameter and 5 mm inside diameter with a 15 mm cylinder length was immersed in a solution of alumina particles and urethane resin dispersed in solvent to impregnate the felt with the alumina particles and urethane resin.

The weight ratio of this mixture of alumina, urethane resin, and solvent is shown below.

|  |  |  |
|---|---|---|
| α alumina |  | 10 parts |
| polyurethane |  | 1 part |
| Solvent: | cyclohexane | 30 parts |
|  | toluene | 60 parts |
|  | methyl ethyl ketone | 90 parts |

After immersing the felt in this solution, curing was promoted at 60° C. for 12 hours. A head cleaning roller 3 in which this impregnated felt 3a was mounted on the holder member 3d was then installed in a magnetic recording and reproducing apparatus equivalent to a commercial VHS video deck. Using a 120-min. length metallic magnetic powder-type magnetic tape, a 100-cycle repeated playback test (equivalent to an approximately 200 hr. playing time) was performed to investigate the change in the playback characteristics.

This test was conducted under typical low humidity conditions, specifically at a 23° C. ambient temperature and 10% relative humidity. The magnetic head used in the test had a metal magnetic core, and the wavelength of the recorded signal was 0.7 μm. The rotating roller support member 4 supporting the cleaning roller 3 was intermittently moved near the magnetic head 2 by means of a timer circuit (not shown) and intermittent application of power to a solenoid (not shown) connected to the rotating roller support member 4, thereby contacting the head cleaning roller 3 to the magnetic head 2 for a predetermined period.

The contact time between the head cleaning roller 3 and magnetic head 2 in the head cylinder 1, i.e., the operating time, in this test of the first embodiment was 3 sec., and the no-contact time between the head cleaner 3 and magnetic head 2, i.e., the standby time, was 30 min. The duration of each mode is determined by the density and materials of the polymer resin 3b and abrasive particles 3c used in the head cleaner 3, the pressure of the head cleaning roller 3 on the magnetic head 2, and the operating environment, i.e., the temperature and humidity. The results of this repeated tape travel test are shown in Table 1 bellow.

TABLE 1

|  | Output drop (dB) | Seizing of brown stains | Clogging (sec.) |
|---|---|---|---|
| First experiment | −0.5 | none | approx. 1 to 3 |
| Second experiment | −1.5 | minimal | approx. 3 |
| Comparison 1 | −3.5 | sever | 10 Min. |

"Output drop" expresses the output measured after the 100-cycle repeated playback test described above referenced to the output measured before the experiment.

"Seizing" indicates the presence of seized deposits (brown stain) on the magnetic head surface after the 100-cycle repeated playback test when observed under an optical microscope at a 200× magnification ratio.

"Clogging" is the total time of clogging observed during the repeated playback test.

"Comparison 1" shown in Table 1 shows a result obtained from an experiment performed on a magnetic recording and reproducing apparatus comprising a conventional head cleaning device, i.e., a felt cleaning roller is not impregnated with the alumina particles and urethane resin. In "Comparison 1", the head surface is only wiped by the conventional cleaning device under the same test conditions as first and second experiments.

Based on the results shown in Table 1, it is clear that seized deposits on the sliding surface of the magnetic head can be removed, and that the output drop and clogging resulting from the occurrence of seized deposits on the magnetic head are minimal when the cleaner is a felt member impregnated with alumina particles and urethane resin.

Second experiment

The head cleaning device according to the first embodiment is used in this experiment. The cleaning roller 3 was prepared by immersing the felt soft material in a solution of perfluoro polyether liquid dispersed at room temperature (25° C.) in isopropyl alcohol at 1500 ppm. Essentially the same repeated playback test conducted with the first embodiment described above was conducted, and the results are shown in Table 1. While the output drop was −1.5 dB and a minimal quantity of seized deposits was observed with this cleaner 3, there was still a significant reduction in seized deposits and a reduction in clogging relative to "Comparison 1".

Third experiment

The head cleaning device according to the second embodiment is used in this experiment. The cleaning roller 3 having first and second cleaning portions 3g and 3h was prepared by the method shown in FIG. 10, i.e., using a variable immersion depth h of the cylindrical felt member 3a in the solution 7. The solution described in the first experiment above was used for the solution 7. The repeated playback test described in the first experiment was also conducted. In addition to the items evaluated in the first experiment, the dropout characteristic was also measured additionally.

This dropout refers to a signal loss of −16 dB or greater for a period of 15 μsec or longer expressed as the number of dropouts counted per unit time. Using a variable immersion depth h, the test results are shown in Table 2 as "Third experiment".

experiment was again performed.

As will be known from the results for this experiment shown in Table 2, improvements in seizing, clogging, and dropout relative to "Comparison 1" are obtained. It is to be noted that this fifth experiment offers the additional benefit of requiring less space than does the fourth experiment because the first and second cleaning members 5a and 5b are

TABLE 2

| | | 1st Cleaning Unit | | 2nd Cleaning Unit | | | | | |
|---|---|---|---|---|---|---|---|---|---|
| | | Operation Mode | | Operation Mode | | Result | | | |
| Experiment | Immersion Depth h | TO (Sec) | TS (min) | TO (Sec) | TS (min) | Output (−dB) | Seizure | Clogging (Sec) | Drop Out (/min) |
| Third | 3 | 1 | 30 | 2 | 30 | 1.5 | minimal | 0.5 | 40 |
| | 7 | 2 | 30 | 1 | 30 | 0.5 | none | 0.5 | 30 |
| | 10 Min. | 3 | 30 | — | — | 0.5 | none | 1–3 | 50 |
| Fourth | 10 Min. | 3 | 30 | 3 | 30 | 0.5 | none | 1 | 40 |
| | 10 Min. | 1 | 10 | 3 | 30 | 0.5 | none | 0.3 | 10 |
| Fifth | 10 Min. | 3 | 30 | 3 | 30 | 0.5 | none | 1 | 40 |
| Comparison 1 | — | — | — | 3 | 30 | 3.5 | severe | 10 Min. | 100 Min. |

TABLE 3

| | | 1st Cleaning Unit | | 2nd Cleaning Unit | | | | | |
|---|---|---|---|---|---|---|---|---|---|
| | | Operation Mode | | Operation Mode | | Result | | | |
| Experiment | Immersion Depth h | TO (Sec) | TS (min) | TO (Sec) | TS (min) | Output (−dB) | Seizure | Clogging (Sec) | Drop Out (/min) |
| Sixth | 10 Min. | 3 | 30 | — | — | 0.5 | none | 1–3 | 50 |
| Comparison | 10 Min. | 3 | 30 | — | — | 3.5 | severe | 10 Min. | 100 Min. |

The results obtained with that an immersion depth h is greater than 10 are shown in the first experiment above. When the first and second cleaning members are simultaneously prepared in the felt member using a variable immersion depth h, clogging and dropout can be further improved.

In table 2, "TO" expresses the operation period while the cleaning rollers are pressed against the circumference surface of head cylinder 1 for cleaning the magnetic head 2.

"TS" expresses interval period between each operation cleaning operation of the cleaning roller.

Forth experiment

In this experiment, the head cleaning device comprising separate first and second cleaning units 5a and 5b according to the third embodiment of the present invention was prepared. The first cleaning roller 5a was a felt member impregnated with abrasive particles and polymer resin at an immersion depth h≧10 to impart an abrasive action as in the first embodiment. The second cleaning member providing the residual deposit wiping function was prepared with an immersion depth h=0, i.e., unimmersed in the solution 6. The same repeated playback test described in the first experiment was conducted. As shown by the results under the forth experiment 4 in Table 2, seizing, clogging, and drop-out are improved relative to "Comparison 1".

Fifth experiment

In this experiment, the cleaning device comprising discrete first and second cleaning members 5a and 5b supported by a common rotating roller support member 40 according to the fourth embodiment of the present invention was used. The same repeated playback test conducted in the first supported by a single rotating roller support member 40.

Sixth experiment

In this experiment, the head cleaning device according to the first embodiment is used. The cleaning roller 3 was prepared using polyvinyl alcohol as the polymer resin, α alumina for the abrasive particles, and water as the solvent in the immersion solution 7 at the following weight ratio.

| α alumina | 3 parts |
|---|---|
| polyvinyl alcohol | 1 part |
| water | 50 parts |

The cleaning roller is made of soft material of nonwoven fabric comprising rayon and acetate at a 1:1 ratio with acrylate as the binder was immersed in this solution 7. The same repeated playback test described in the first embodiment was again performed. The results are shown in Table 3.

"Comparison 2" shown in Table 3 shows the results for a head cleaning device comprising the cleaning roller made of the nonwoven soft cloth used in the sixth experiment and is immersed in the solution 7 of the first experiment. It is obvious that the cleaner prepared with a nonwoven fabric obtains the same effects achieved with the cleaner of the first experiment. With the cleaning roller of "Comparison 2", however, the binder is dissolved by the organic solvent, resulting in irregular disruption of the fibers and loss of functionality as a soft material. Specifically, because the cleaner does not contact the magnetic head with a soft touch, the desired effect is not obtained in the applied magnetic recording and reproducing apparatus.

With the cleaning roller prepared according to the sixth experiment, however, no change is observed in the binder of the nonwoven fabric even after immersion in the solution 7, and the cleaner can therefore function as a soft material with an abrasive action.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A head cleaning device used for cleaning the circumference surface of a rotating magnetic head of a magnetic recording and reproducing apparatus to prevent and remove brown stain formed thereon, said device comprising:

cleaning roller means having a soft material and being impregnated with an organic lubricant and an abrasive particle; and support means for rotatably supporting said cleaning roller means along an axis thereof and pressing said cleaning roller means with a predetermined rotational resistance against the circumference surface of said magnetic head such that the circumference surface of said cleaning roller means cleans the surface of said magnetic head while said cleaning roller means is rotated by said magnetic head in rotation.

2. A head cleaning device used for cleaning the circumference surface of a rotating magnetic head of a magnetic recording and reproducing apparatus to prevent and remove brown stain formed thereon, said device comprising:

cleaning roller means having a soft material and impregnated with an organic lubricant; and support means for rotatably supporting said cleaning roller means along an axis thereof and pressing said cleaning roller means with a predetermined rotational resistance against the circumference surface of said magnetic head such that the circumference surface of said cleaning roller means cleans the surface of said magnetic head while said cleaning roller means is rotated by said magnetic head in rotation.

3. A head cleaning device as claimed in claim 2, wherein said cleaning roller means is further impregnated with abrasive particles and polymer resin.

4. A head cleaning device as claimed in claim 2, wherein said organic lubricant is in a liquid state at temperatures less than 40° C.

5. A head cleaning device used for cleaning the circumference surface of a rotating magnetic head of a magnetic recording and reproducing apparatus to prevent and remove brown stain formed thereon, said device comprising:

cleaning roller means having a soft material, wherein said cleaning roller means includes a first portion impregnated with an organic lubricant and abrasive particles and polymer resin for removing said brown stain and a second portion for wiping off any abrasive particles and deposits left on said magnetic head surface immediately after cleaning by said first portion; and support means for rotatably supporting said cleaning roller means along an axis thereof and pressing said cleaning roller means with a predetermined rotational resistance against the circumference surface of said magnetic head such that the circumference surface of said cleaning roller means cleans the surface of said magnetic head while said cleaning roller means is rotated by said magnetic head in rotation.

6. A head cleaning device used for cleaning the circumference surface of a rotating magnetic head of a magnetic recording and reproducing apparatus to prevent and remove brown stain formed thereon, said device comprising:

first cleaning roller means impregnated with an organic lubricant and abrasive particles and polymer resin for removing said brown stain;

second cleaning roller means for wiping off any abrasive particles and deposits left on said magnetic head surface after cleaning by said first cleaning roller means; and support means for rotatably supporting said each of said first and second cleaning roller means along an axis thereof and pressing said first and second cleaning roller means with a predetermined rotational resistance against the circumference surface of said magnetic head such that the circumference surface of said cleaning roller means cleans the surface of said magnetic head while said first and second cleaning roller means are rotated by said magnetic head in rotation.

* * * * *